July 7, 1959  J. W. BRADBURY  2,893,245
THERMOMETER
Filed Dec. 23, 1957  2 Sheets-Sheet 1
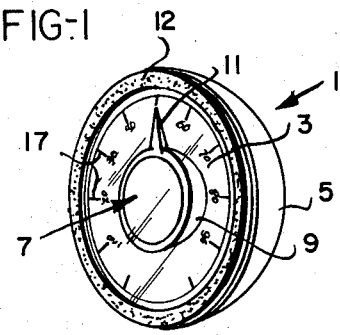
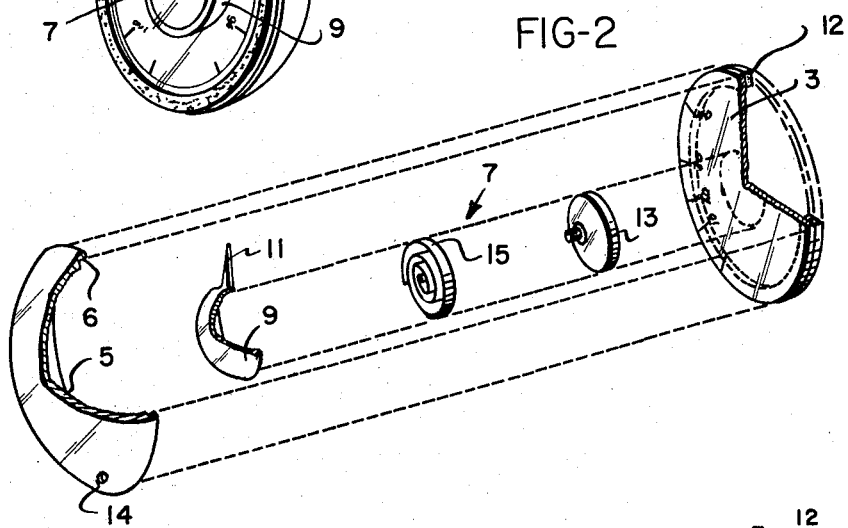
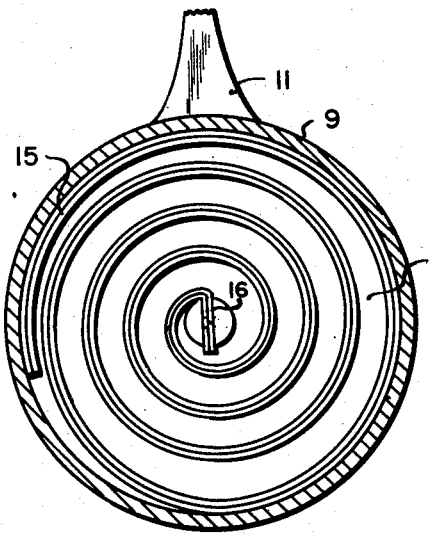
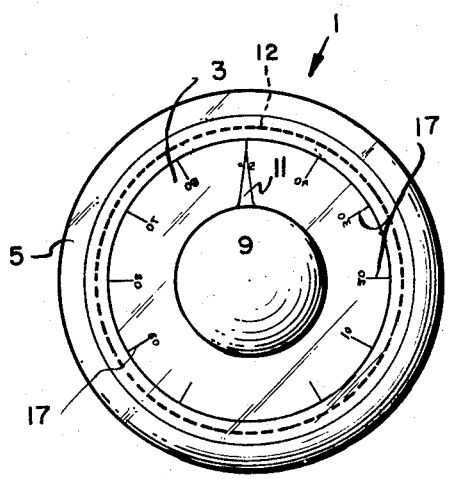
INVENTOR.
JAMES W. BRADBURY
BY *Toulmin & Toulmin*
ATTORNEYS July 7, 1959  J. W. BRADBURY  2,893,245
THERMOMETER
Filed Dec. 23, 1957  2 Sheets-Sheet 2
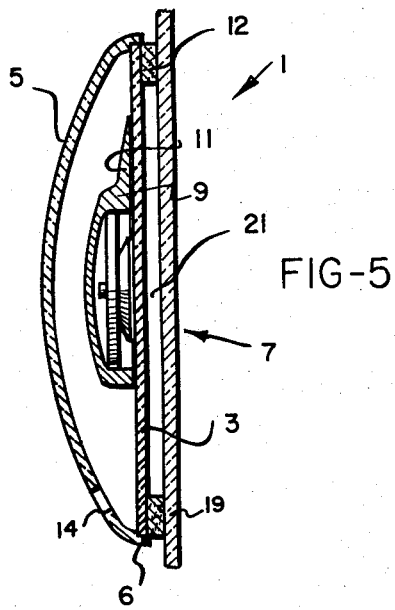
FIG-5
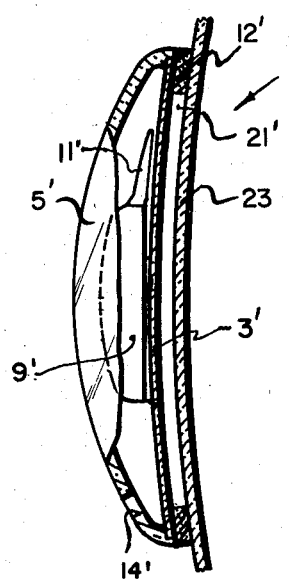
FIG-6
FIG-7
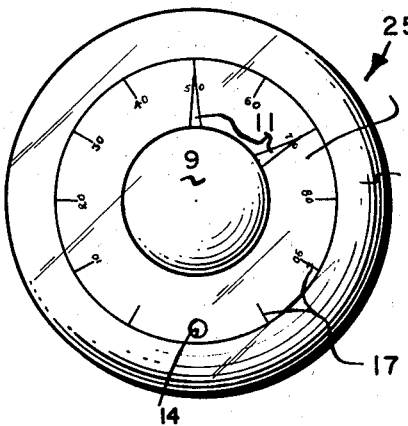
FIG-8
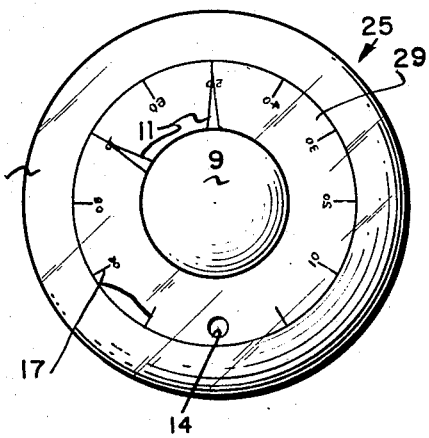
FIG-9
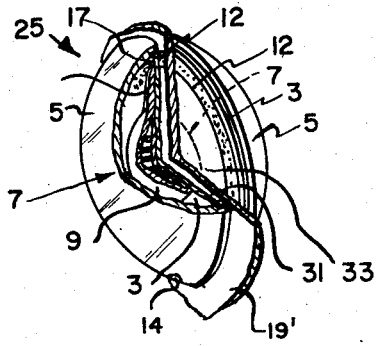
INVENTOR.
JAMES W. BRADBURY
BY *Toulmin & Toulmin*
ATTORNEYS

United States Patent Office 2,893,245
Patented July 7, 1959

2,893,245
THERMOMETER

James W. Bradbury, Springfield, Ohio, assignor to Paul R. Pontis and Associates, Inc., Springfield, Ohio, a corporation of Ohio Application December 23, 1957, Serial No. 704,518

5 Claims. (Cl. 73—363.3)

This present invention relates to a thermometer and particularly to a "see-through" thermometer in which the instrument may be viewed from opposed sides for reading of the temperature.

The invention contemplates the provision of a thermometer in which the temperature sensing element is housed within an enclosure formed by transparent members, one of which members has an aperture therethrough forming a static air opening communicating the interior of the enclosure with the exterior. One of the members is also provided with means for attaching the thermometer to a surface in such manner that a dead air space is provided between the surface and the one member. The formation of the dead air space between the surface of attachment and the enclosure inhibits fogging and condensation within the enclosure, thus providing for good visibility and accurate thermometer readings at all times.

The invention further contemplates the utilization of a low thermal conductivity adhesive, such as an asphaltic base adhesive, as the means for attachment of the thermometer to the surface. Such inhibits heat transfer between the surface to which the thermometer is attached and the enclosure, and also between the surface and the members forming the enclosure.

A particular object of the invention is the provision of a thermometer which exhibits good readability even under poor lighting condition whether the lighting is from the front, back, side or interior.

Yet another object of the invention is to provide a thermometer which is of simple and improved construction, which is composed of few but simple, readily assembled parts, all so constructed and arranged as to preclude the liability of breakage or derangement of the same; which thermometer is positive and accurate and which is suitably of relatively small size and weight.

The invention will be more fully understood by reference to the following detailed description and accompanying drawings wherein:

Figure 1 is a perspective view of one embodiment of the thermometer of invention;

Figure 2 is an exploded and perspective view illustrating the arrangement of the component parts of the thermometer of Figure 1 and with some parts broken away and in section;

Figure 3 is an enlarged view particularly illustrating a mode of mounting the temperature sensitive element and its associated pointer;

Figure 4 is a rear view of the thermometer of Figure 1; with a portion broken away to clearly indicate in dotted lines the inner boundary of the adhesive of low thermal conductivity;

Figure 5 is an elevational view partially in section illustrating the thermometer of Figure 1 mounted in position on a surface of a transparent flat panel;

Figure 6 is a view illustrating another modification of a thermometer in accordance with the invention and mounted on a curved surface such as a windshield of an automobile;

Figure 7 is a front elevation of another embodiment of the invention and illustrates a dual, see-through instrument;

Figure 8 is a rear view of the instrument of Figure 7; and

Figure 9 is a perspective and somewhat smaller view of the dual thermometer of Figures 7 and 8 on a panel and with parts broken away illustrating the single thermometer scale of the unit.

Referring to the drawings and first particularly to Figures 1–5, inclusive, the numeral 1 designates generally a thermometer in accordance with the invention. The thermometer (Figure 1) comprises a substantially flat transparent base member 3 in the form of a circular disc of a suitable material, such as Lucite, Plexiglas, or any transparent material having good optical properties.

A hollow closure member 5 shown as of concavo-convex shape, also of transparent material, such as Lucite or Plexiglas, forms with the base member 3 an enclosure for a temperature responsive assembly of the thermometer, shown generally at 7 in Figure 2. To form the enclosure a peripheral ledge 6 is provided on the closure member 5 for receipt of the base member 3; base member 3 supports the temperature responsive assembly 7 centrally of the enclosure in any suitable manner, a preferred arrangement being noted more particularly hereinafter.

Housed within the enclosure and forming a part of the temperature responsive assembly is a recessed body 9 having a pointer 11 of opaque material; pointer 11 is preferably integral with body 9 which recessed body receives therein the stud 13 and the temperature sensitive coil element 15 in frictional engagement. Stud 13 is secured to one end of the temperature sensitive element in a slot of the stud (Figure 3) and supports the element centrally; the stud itself is cemented to the base member 3 centrally internally of the enclosure.

The concavo-convex closure member 5 is provided at 14 with an aperture through the member, which aperture forms a static air opening communicating the interior of the enclosure with the exterior; this provides the same atmospheric conditions within the enclosure as exist on the exterior of the concavo-convex member.

Referring now more particularly to the temperature sensitive element 15, it is suitably in coil form and composed of two metals in thin strip form compressed face to face and secured together. Such elements are known and expand and contract with temperature rise and fall.

In the present instance the outer turn of the coil 15 (Figure 3) is circular in form and constantly frictionally engages the body 9 within the recess, within the temperature range of the instrument. As the material of the coil expands and contracts the pointer 11 and body 9 move with the expansion and contraction.

The base member 3 in addition to supporting the temperature responsive assembly is provided on a face thereof with graduations 17 of suitable opacity for indicating temperature to a viewer of the instrument.

In the present instance, as shown in Figure 1, the scale is graduated from zero to 100° in ten degree intervals; in actual practice these intervals are subdivided in a usual manner to indicate one degree variations. The graduations are opaque and may effectively be in color, thus enhancing the attractiveness of the instrument. The pointer 11 traverses the graduations with temperature change and the pointer is clearly visible from either side of the instrument (Figures 1 and 4).

The face of the base 3 on the rim thereof, as most clearly shown in Figures 1 and 2, is provided on the side remote from the concavo-convex member 5 with a body 12 in narrow strip form of an adhesive. This body 12 projects from the face of the base and extends continuously around the periphery of the face enclosing substantially all of the face.

Most suitably this adhesive is applied by a silk screen process as a relatively viscous material, and the representative adhesive thickness suitable for most applications is approximately 1/16 to 3/32 of an inch. The adhesive also is preferably selected to be of low thermal conductivity in order that when the thermometer is mounted on a transparent panel 19 (Figure 5) there will be little heat transfer between the panel and the base 3. Such adhesives are generally commercially available and usually are of an asphaltic base.

Referring now particularly to Figure 5, it will be noted that when the thermometer is mounted with the pressure sensitive adhesive contacting the transparent panel 19 for the support of the thermometer, a dead air space 21 is formed between the panel and the base member 3. This dead air space prevents heat transfer between the panel and the base member and accordingly between the panel, the base member and the enclosure.

Accordingly the temperature within the enclosure is dependent substantially solely upon the temperature of the atmosphere in which the thermometer is positioned.

Further, since the temperature within the enclosure is substantially the same as that on the exterior outside the aperture, no condensation or fogging will occur within the enclosure. Therefore a user of the device will have clear visibility through the thermometer except at the very center portion. Also, the thermometer itself will be more accurate since the temperature sensitive element is protected from ambinet temperature effects by the thermal insulating means provided as noted.

In the structure of Figure 6 components of the thermometer are designated with similar numerals but primed. Referring to Figure 6 it is to be particularly noted that a thermometer 1' may be mounted also on a curved surface, as panel 23, while achieving the same thermal insulation effects and the beneficial results and good visibility and accurate temperature measurement.

For this purpose the base member 3' is provided with a slight curvature and pointer 11' is also slightly curved to correspond to the base curvature. However, it is to be particularly noted that curvature of base member 3 is not always necessary to secure the thermometer to a curved surface, for the thermometer of Figure 5, due to the protruding adhesive 12, is clearly adapted for mounting on some curved surfaces.

Shown in Figures 7, 8 and 9 is a dual thermometer indicated generally at 25. This structure comprises one thermometer 27 similar to that just described in connection with Figures 1–5, inclusive. The other portion 29 of the unit of Figures 7 and 8 is also similar to that of Figure 1 except that the flat disc of the thermometer does not carry temperature graduations.

As will be noted from Figure 9 the structure of Figures 7 and 8 is mounted on opposite sides of a panel 19' and the unit provides with the panel 19' dead air spaces 31, 33 in back to back relation, thus insulating thermally the temperature sensitive elements of the combination. Further the back to back dead air spaces inhibit condensation and fogging within the thermometers, as already indicated in connection with the prior embodiment.

The units 27 and 29 are separately manufactured but are mounted on a panel for shipment in the same manner as that in which they will be used and as shown in Figure 9.

It is also to be noted that the structure Figures 7, 8 and 9 are mirror images.

While the invention has been particularly described in connection with thermometers in which the base is circular in contour and the housing is concavo-convex and corresponds to the base for forming the enclosure, it will be understood that other contours of base and closure which cooperate to form the enclosure may be employed.

The units of invention are particularly applicable for measuring indoor and outdoor temperatures simultaneously and have applicability to windows, automobile windshields, and similar transparent media, where the instrument does not substantially affect viewing through the media.

Features of the invention also particularly include the economy attainable by providing the structural parts such as the base member, closure member, the body 9 and its associated pointer 11 of plastic materials; body 9 and pointer 11 are particularly adapted for being provided in attractive colors while the base and closure members are of clear plastic, and preferably simply cemented together.

Accuracy of the thermometer is improved by the provision of the static air opening in a lower portion of the closure member well removed from the temperature sensitive element.

With regard to the dual thermometer, the combination of a transparent panel with the transparent housings provides a very useful display device for the enhancement of sales.

It will be understood that this invention is susceptible to modification in order to adapt it to different usages and conditions and accordingly, it is desired to comprehend such modifications within this invention as may fall within the scope of the appended claims.

What is claimed is:

1. In a thermometer, for combination with a panel which is transparent and whereby the thermometer is viewable from both sides of the panel, a transparent housing having a base portion, projecting means on an outer face of the housing base portion disposed continuously around to enclose an area of the face of the base portion to form a dead air space with the panel thereby to thermally insulate the interior of the housing from the panel, a closure member on the face of the base portion opposite the projecting means, said closure member and base portion forming the said housing, temperature sensitive means mounted within the housing, opaque temperature graduations on the housing viewable from the exterior of the housing, an opaque pointer within the housing actuated by the temperature sensitive means movable along the graduations and also viewable from the exterior of the housing, and means comprising an aperture through the closure member of the housing forming a static air opening communicating the interior of the housing with the exterior whereby the temperature conditions of the exterior are presented to the temperature sensitive means.

2. In a thermometer, a transparent base member and a hollow transparent closure member secured together forming an enclosure, temperature sensitive means mounted within the enclosure, opaque temperature graduations on one of the members, an opaque pointer within the enclosure actuated by the temperature sensitive means and movable along the graduations, one of said members also having an aperture therethrough forming a static air opening communicating the interior of the enclosure with the exterior, and on a face of the other member, and which face is remote from the said one member, a projecting body of a pressure-sensitive adhesive which extends from the face continuously around and encloses a portion of the face peripherally for attaching the thermometer to a surface, the said body of adhesive projecting from the face sufficiently to provide a dead air space between a surface to which it is attached and the said base.

3. In a thermometer, a transparent flat base member and a transparent concavo-convex closure member secured together forming an enclosure, a temperature responsive assembly supported centrally within the enclosure on the flat base member and including temperature sensitive means, opaque temperature graduations on the flat base member, an opaque pointer of the temperature responsive assembly within the enclosure actuated by the temperature sensitive means and movable along the graduations, said closure member having an aperture therethrough forming a static air opening communicating the interior of the enclosure with the exterior, and on a face of the base member, and which face is remote from the said closure member, a projecting body of a pressure sensitive adhesive which extends from the face continuously around the rim of the face and encloses the face peripherally for attaching the thermometer to a surface, the said body of adhesive projecting from the face sufficiently to provide a dead air space between a surface to which it is attached and the said face.

4. In a thermometer, a transparent base member and a transparent concavo-convex closure member secured together forming an enclosure, the base member curving inwardly of the enclosure towards the closure member; a temperature responsive assembly supported centrally within the enclosure on the inwardly curving base member and including temperature sensitive means, opaque temperature graduations on the inwardly curving base member, an opaque pointer of the temperature responsive assembly within the enclosure curved to extend substantially parallel with the base member, actuated by the temperature sensitive means and movable along the graduations, said closure member having an aperture therethrough forming a static air opening communicating the interior of the enclosure with the exterior, and on a face of the base member, and which face is remote from the said closure member, a projecting body of a pressure-sensitive adhesive which extends from the face continuously around the rim of the face and encloses the face peripherally for attaching the thermometer to a surface, the said body of adhesive projecting from the face sufficiently to provide a dead air space between a surface to which it is attached and the said face and whereby the enclosure is thermally insulated from a surface to which the thermometer is attached.

5. In a thermometer, for combination with a panel which is transparent and whereby the thermometer is viewable from both sides of the panel, a transparent housing having a substantially flat base portion and a hollow transparent closure member on one face of the base portion, projecting means on the other and outer face of the housing base portion disposed continuously around the periphery of the face to enclose the face of the base portion to form a dead air space with the panel thereby to thermally insulate the interior of the housing from the panel, temperature sensitive means mounted within the housing supported by the flat base portion, opaque temperature graduations on the flat base portion of the housing viewable from the exterior of the housing, an opaque pointer within the housing actuated by the temperature sensitive means movable along the graduations and also viewable from the exterior of the housing, and means comprising an aperture through the housing closure member forming a static air opening communicating the interior of the housing with the exterior and exposing the temperature sensitive means and pointer to the exterior whereby the temperature conditions of the exterior are presented to the temperature sensitive means and pointer.

References Cited in the file of this patent

UNITED STATES PATENTS

| | | |
|---|---|---|
| 2,235,252 | Bradley | Mar. 18, 1941 |
| 2,803,137 | Bradley | Aug. 20, 1957 |
| 2,839,924 | Pauli | June 24, 1958 |